INVENTOR
JOHN D. LEHR
JOHN L. WELLS
BY Brown & Rosen

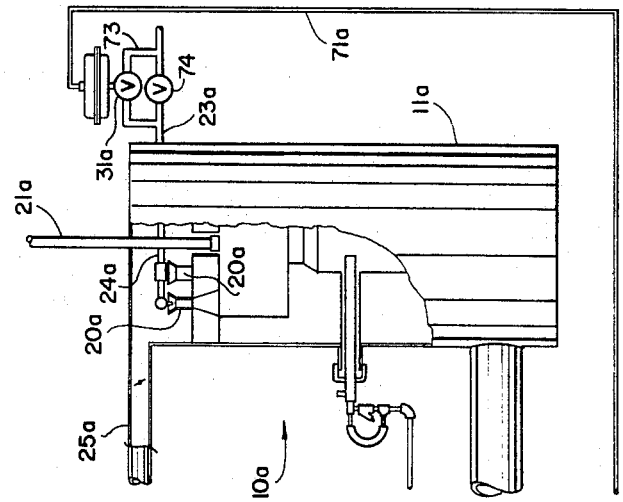
FIG. 2
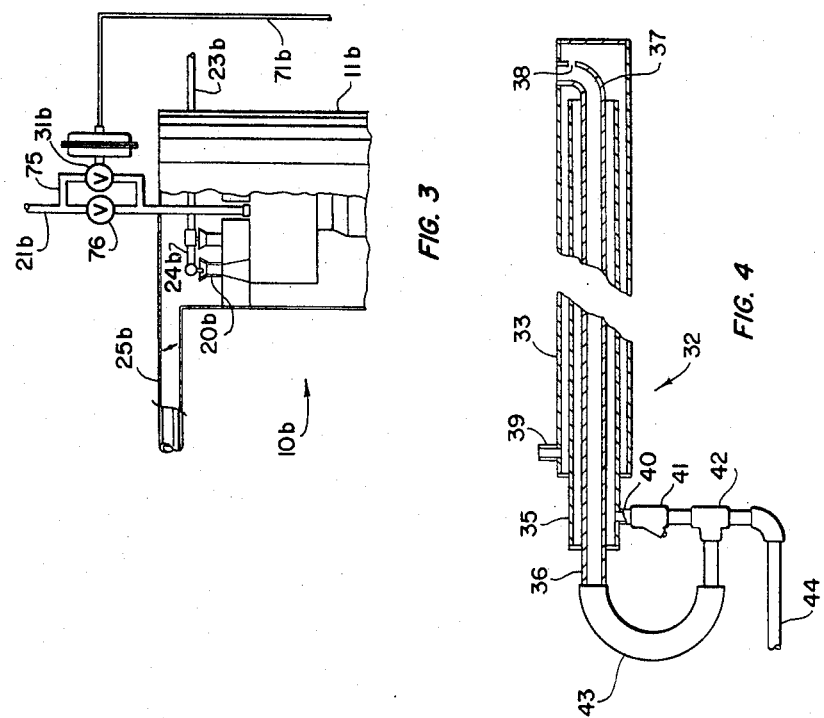
FIG. 3
FIG. 4

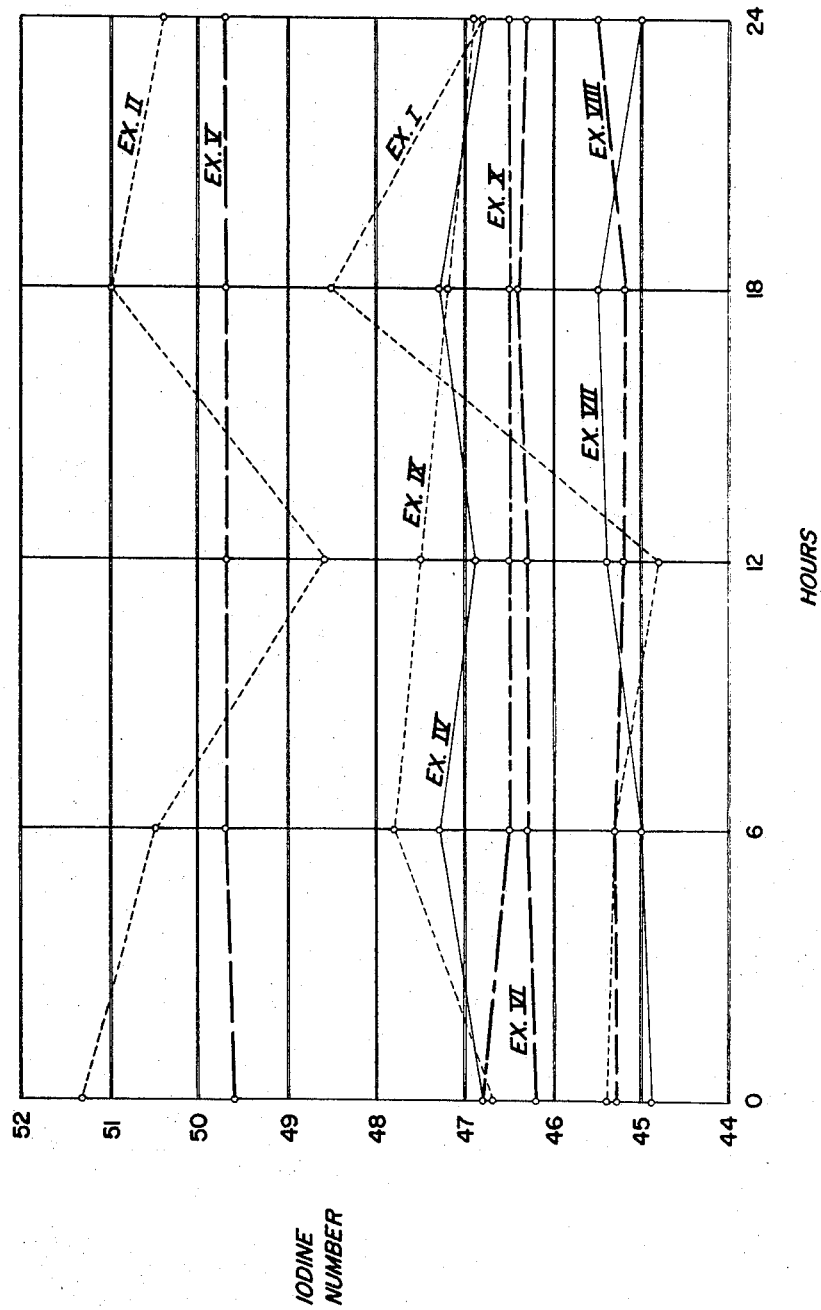

United States Patent Office 3,471,260
Patented Oct. 7, 1969

3,471,260
METHOD FOR CONTROLLING CARBON BLACK FURNACES
John Dalton Lehr and John Lee Wells, Borger, Tex., assignors to J. M. Huber Corporation, Locust, N.J., a corporation of New Jersey
Filed Aug. 30, 1965, Ser. No. 483,727
Int. Cl. C09c 1/48
U.S. Cl. 23—209.4                                                 3 Claims

ABSTRACT OF THE DISCLOSURE

A method of controlling the operation of a carbon black furnace to produce carbon black having a controlled surface area. The method includes continuously measuring the relative thermal conductivity of the combustion gases produced in the furnace and continuously controlling the input of at least one of the raw materials fed to the carbon black furnace where those raw materials include the input of fuel, hydrocarbon make stock, and air. The control of the input of raw materials is made in response to changes in the relative thermal conductivity of the combustion gases.

---

This invention relates to a method of and apparatus for controlling carbon black furnaces.

"Furnace" carbons are usually produced in reactors or furnaces in which hydrocarbon fuels are reacted with air or other oxygen containing gases within a confining structure. The air or oxygen containing gas supplied is less than that required for complete combustion and the combustion usually takes place in a turbulent manner. After combustion the hot carbon laden gases are cooled by quenching with water and the carbon separated by suitable means.

Carbon producing furnaces preferably use hydrocarbon oils and/or hydrocarbon gases and air in various combinations and ratios in order to produce the various types of "furnace" carbon black.

One method of doing this is to burn natural gas and air by means of one or more burners arranged within the confines of a furnace structure and to axially introduce a hydrocarbon fuel (oil, gas or gas oil mixtures) into the turbulent zone of hot gases. The result of commingling these hot combustion gases and the hydrocarbon fuel in an atmosphere containing less oxygen than that required for complete combustion of the hydrocarbons results in a combustion gas stream containing free carbon and various gaseous products such as hydrogen, carbon monoxide, carbon dioxide, water, acetylene and methane.

The quality of the carbon produced in a given furnace is known to be influenced by the quality of the hydrocarbons used, the temperature of the furnace, the ratios between the B.t.u. content of the gaseous hydrocarbon and air, and the relative proportions of hydrocarbons and air. It is customary to meter and control the amount of hydrocarbons and air admitted to the furnace by commercial instruments which have a basic accuracy on the order of 1% by volume or mass. While this method of control is capable of producing a high quality carbon black, the furnace may deviate from the desired setting and small changes often occur in the composition of the input streams which are not detected by such instruments.

One method used to control the quality of the carbon black content is to conduct an ASTM 1510-60 iodine absorption test which results in an iodine number useful for determining the surface area of the carbon black. During normal operator controlled operation of a carbon black furnace frequent iodine tests are conducted and from the results the operator adjusts the settings of his furnace in order to try to maintain the desired iodine number. This method, however, results in an undesirable time lag during which the furnace may further deviate from the desired condition. Other test procedures such as the oil absorption test and B.E.T. surface area measurements may be used in order to determine the extent and kind of other adjustments required. The control of feed rates to a furnace by these other methods also results in an undesirable time lag during which the furnace may produce large quantities of off spec material.

Further, if a furnace is shut down and later returned to production it is frequently necessary to perform a number of tests on the carbon quality and make many adjustments to the furnace in order to again produce the desired uniform high quality carbon black. A continuous method providing a closer degree of control is desirable.

The primary object of the present invention is to provide a method and apparatus for continuously controlling a carbon black furnace.

Another object of the invention is to provide a control system for carbon black furnaces with a minimum of time lag between the occurrence for the need for change in control and the actual change in control.

A further object of the invention is to provide a control system of the class described above which automatically adjusts one or more of the raw material streams upon changes occurring in products of the furnace.

Other objects and advantages will become apparent in the following specification when taken in light of the attached drawings in which:

FIGURE 2 is a fragmentary view similar to FIGURE 1 illustrating a modification of the invention in which the burner gas supply is controlled;

FIGURE 3 is a fragmentary view similar to FIGURE 1 illustrating another modified form of the invention in which the hydrocarbon make stock of the furnace is controlled;

FIGURE 4 is an enlarged fragmentary sectional view of the sample probe; and

FIGURE 5 is a graph illustrating the relationship of the iodine numbers of the examples.

Figure 1:
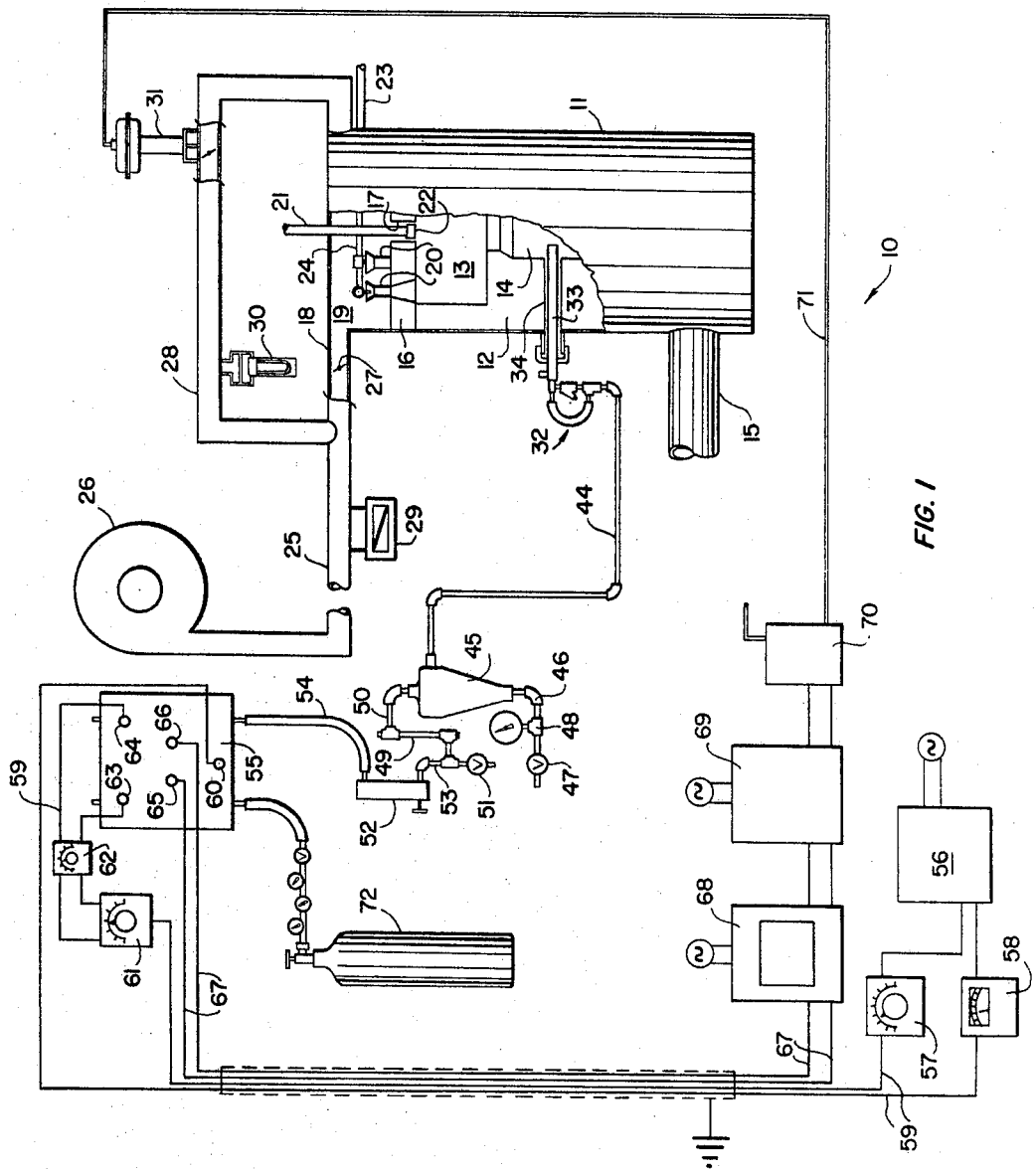
FIGURE 1 is a semi-diagrammatic view of a carbon black furnace having the control system of the invention associated therewith shown controlling the furnace air supply.

Referring now to the drawings in detail wherein like reference characters indicate like parts throughout the several figures the reference numeral 10 indicates generally a carbon black furnace control system constructed in accordance with the invention. In the carbon black furnace control system 10 a carbon black furnace 11 of any conventional design such as that illustrated in U.S. Patent No. 2,971,822, has an elongated generally cylindrical body 12. A generally cylindrical combustion chamber 13 is formed centrally of one end of the body 12 and an elongated cylindrical reaction chamber 14 communicates with the combustion chamber and extends axially downwardly in the body 12. A conduit 15 extends from the lower end of the reaction chamber 14 to a carbon black collection system (not shown). A head 16 covers the upper end of the combustion chamber 13 and has a central bore 17 extending therethrough. A sheet metal housing 18 extends upwardly from the head 16 and forms a plenum chamber 19. A plurality of gas burners 20 are positioned in the plenum chamber 19 extending through the head 16 into the combustion chamber 13. The burners 20 are arranged in a circle and have their axes parallel to the axis of the combustion chamber 13. A hydrocarbon make stock feeder pipe 21 extends completely through the plenum chamber 19 and through the bore 17 in the head 16 terminating at the combustion chamber 13. The pipe 21 is positioned on the axis of the combustion chamber 13. A spray nozzle 22 is mounted on the lower end of the pipe 21 for introducing the make stock into the combustion chamber 13 in a fine spray. A gas feeder pipe 23 is coupled to a manifold 24 connected in turn to each of the burners 20.

An air supply conduit 25 extends from an air pump 26 to the plenum chamber 19. A manually operated valve 27 is mounted in the conduit 25 adjacent the plenum chamber 19. A bypass conduit 28 extends from the conduit 25, at a point lying between the pump 26 and the valve 27, to the plenum chamber 19.

An orifice meter 29 is mounted in the conduit 25 between the pump 26 and the bypass 28. A second orifice meter 30 is positioned in the conduit 28. A pneumatically operated control valve 31 is positioned in the conduit 28 for completely closing the bypass 28 when required.

In the operation of the carbon black furnace 11 described above the burners 20 provide hot combustion gases in the combustion chamber 13 and hydrocarbon make stock is fed to the combustion chamber 13 through the pipe 21. Air supporting combustion is fed to the plenum chamber 19 through the conduit 25 and the bypass conduit 28. The air in the plenum chamber 19 feeds the burners 20 and also feeds into the combustion chamber 13 around the pipe 21. Carbon black is formed conventionally in the combustion chamber 13 and the reaction chamber 14. The carbon black so formed is quenched in the usual manner (not shown) and is fed through the conduit 15 to a collection system (not shown).

A sampling probe indicated generally at 32, FIGURE 4, such as that illustrated in U.S. Patent 2,550,933, consists of a cylindrical elongated body 33 which extends through a bore 34 in the furnace 11 so that the inner end of the probe 32 is within the reaction chamber 14. The bore 34 may either be upstream or downstream of the quench sprays (not shown). The probe 32 has a cylindrical water baffle 35 positioned concentrically within the housing 33 terminating short of the inner end of the housing 33 and extending through the outer end of the housing 33. A sample tube 36 extends concentrically through both ends of the baffle 35 and terminates at its inner end in an elbow 37 which opens through the side of the housing 33 adjacent the inner end thereof. The elbow 37 has a bleed opening 38 formed therein to permit a flow of water from the housing 33 to continuously flush tube 36.

An inlet water fitting 39 is mounted on the housing 33 and an outlet water fitting 40 is mounted on the baffle 35 so that cooling water can be flowed through the housing 33 from the outer end to the inner end and through the baffle 35 around the tube 36 from the inner end to the outer end thereof. A line strainer 41 connects to the fitting 40 and has a jet eductor 42 connected thereto. A conduit 43 connects the sample tube 36 to the jet eductor 42. Flow of water through the jet eductor 42 draws a combustion gas sample from the furnace 11 by aspiration. The water and the gas sample flow from the jet eductor 42 through a pipe 44.

The sample of combustion gas extracted from the furnace 11 has its relative thermal conductivity sensed and changes in the thermal conductivity are then utilized to control the valve 31 in turn controlling the reaction conditions of the furnace 11 in the manner described below.

The pipe 44 extends to a cyclone separator 45 wherein the water and solids entrained with the gas sample in the pipe 44 are separated and discharged to waste through pipe 46. A valve 47 and pressure gauge 48 are used to maintain 3 to 10 p.s.i.g. back pressure on the sample system. The gas sample passes from the separator 45 to a filter 49 through a pipe 50. The filter 49 is packed with glass fiber to separate any remaining entrained water and solids from the gas sample not removed by the separator 45. A drain valve 51 is provided downstream of the filter 49 to remove water and solids separated from the gas sample by the filter 49.

The gas sample then passes to a rotameter 52 through a pipe 53. The rotameter 52 measures the gas flow into conduit 54 which extends to a thermal conductivity cell 55. The thermal conductivity cell 55 is a conventional device manufactured by Gow-Mac Instrument Company and determines relative thermal conductivity by comparison of the sample to a reference gas, in this instance nitrogen. Changes in the thermal conductivity of the sample gas produce an electric signal in the cell 55 proportional to the changes. The cell 55 is powered by a D.C. power source 56 controlled by a rheostat 57 and gauged by an ammeter 58. Suitable wiring 59 connects the power source 56 to the terminal 60 on the cell 55 and to a potentiometer 61 and a ganged dual potentiometer 62 forming part of the circuit of the cell 55. Wiring 59 connects the potentiometers 61, 62 to terminals 63, 64 of the cell 55.

Terminals 65, 66 of the cell 55 carry the electric signal produced in the cell 55 by changes in the thermal conductivity of the sample gas, through wiring 67 to a recorder 68, controller 69 combination. A current to pressure transducer 70 is electrically actuated by the controller 69 and produces a pneumatic signal in a signal line 71 which leads to the pneumatic valve 31 and actuates the valve 31 in response to changes in the electric signal produced in the cell 55.

The reference nitrogen gas for the cell 55 is provided through suitable pressure regulators from a gas bottle 72.

In the relative thermal conductivity sensing portion of the invention the cell 55, power source 56, rheostat 57, ammeter 58, potentiometers 61, 62, recorder 68, controller 69, and current to pressure transducer 70 are each conventional in structure and are available on the market.

In the operation of the carbon black furnace 11 the thermal conductivity of the combustion gases is controlled by the ratio and condition of the three raw materials fed to the combustion chamber; namely, hydrocarbon fuel, air, and hydrocarbon make stock. Once the correct ratio has been established by experimentation for producing a carbon black of the desired properties it is essential that this ratio be maintained during operation of the furnace 11. In the preferred form of the invention illustrated in FIGURES 1 and 4 the air supply to the plenum 19 is divided with up to approximately 10% of the air passing through bypass conduit 28. The valve 31 in the bypass conduit 28, by controlling the bypassed air, determines the total air supplied to the plenum.

The ratio and condition of hydrocarbon fuel, air and hydrocarbon make stock determines the relative thermal conductivity of the combustion gas. Air increases due either to temperature or pressure changes lower the relative thermal conductivity of the combustion gases, whereas increases in either the fuel or make stock or both raise the relative thermal conductivity. In the form of the invention described above control of the upper 10% of the air stream provides control of the relative thermal conductivity throughout its useful range.

While only control of bypass air has been illustrated, it should be understood that the valve 31 may control the total air fed to the furnace 11 when desired.

The following examples are illustrative of the invention but are not to be considered as limiting thereto.

EXAMPLE I

As a control a carbon black furnace 11 was operated for a 24-hour period under operator controlled conditions. The initial furnace settings were:

Air—696 standard cubic feet per minute.
Gas—58 standard cubic feet per minute.
Oil—1.10 gallons per minute.

The gas used herein and in all of the examples was natural gas from the Texas Panhandle. The oil used herein and in all of the examples was Conoco Carbon Black Oil, a residual fuel oil produced by the Continental Oil Company, Denver, Colo. The furnace conditions and structure was such as to produce FEF (fast extruding furnace) carbon black.

In operating the furnace iodine tests (ASTM Test D1510–60) were conducted each 6 hours and the furnace air was varied slightly by hand in order to maintain as near as possible an iodine number of 47.

The iodine numbers for the 24-hour period were as follows:

| Hours: | Iodine number |
|---|---|
| 0 | 45.4 |
| 6 | 45.3 |
| 12 | 44.8 |
| 18 | 48.5 |
| 24 | 46.8 |

EXAMPLE II

As a control Example I was repeated using 715 standard cubic feet per minute of air with the remaining conditions the same. An iodine number of 49.7 was the desired number. The iodine numbers for the 24-hour period were as follows:

| Hours: | Iodine number |
|---|---|
| 0 | 51.3 |
| 6 | 50.5 |
| 12 | 48.6 |
| 18 | 51.0 |
| 24 | 50.4 |

EXAMPLE III

As a control Example I was repeated using 675 standard cubic feet per minute of air with the remaining conditions the same. An iodine number of 39 was the desired number. The iodine numbers for the 24-hour period were as follows:

| Hours: | Iodine number |
|---|---|
| 0 | 39.6 |
| 6 | 38.5 |
| 12 | 36.2 |
| 18 | 37.9 |
| 24 | 39.8 |

EXAMPLE IV

A carbon black furnace 11 was operated for a 24-hour period under the automatic bypass air control of the invention. The initial furnace settings were the same as Example I.

Air—696 standard cubic feet per minute.
Gas—58 standard cubic feet per minute.
Oil—1.10 gallons per minute.

In operating the furnace iodine tests (ASTM Test D1510–60) were conducted each 6 hours and the furnace bypass air was varied slightly by valve 31 in order to maintain as near as possible an iodine number of 47.

The iodine numbers for the 24-hour period were as follows:

| Hours: | Iodine number |
|---|---|
| 0 | 46.8 |
| 6 | 47.3 |
| 12 | 46.9 |
| 18 | 47.3 |
| 24 | 46.8 |

EXAMPLE V

A carbon black furnace 11 was operated for a 24-hour period under the automatic bypass air control of the invention. The initial furnace settings were the same as Example II.

Air—715 standard cubic feet per minute.
Gas—58 standard cubic feet per minute.
Oil—1.10 gallons per minute.

In operating the furnace iodine tests (ASTM Test D1510–60) were conducted each 6 hours and the furnace bypass air was varied slightly by valve 31 in order to maintain as near as possible an iodine number of 49.7.

The iodine numbers for the 24-hour period were as follows:

| Hours: | Iodine number |
|---|---|
| 0 | 49.6 |
| 6 | 49.7 |
| 12 | 49.7 |
| 18 | 49.7 |
| 24 | 49.7 |

As a simple modification of the invention illustrated in FIGURE 1 the control valve 31 was moved to the position of manual valve 27 and the bypass conduit 28 was blocked off. With this arrangement the total air was controlled. The following example illustrates the operation of the invention when the total air is controlled.

EXAMPLE VI

A carbon black furnace 11 was operated for a 24-hour period with the total air supply controlled by the apparatus of the invention. The initial condition settings of the furnace were:

Air—690 standard cubic feet per minute.
Gas—58 standard cubic feet per minute.
Oil—1.10 gallons per minute.

Iodine tests (ASTM Test D1510–60) were conducted at 6 hour intervals and the air supply was varied slightly in order to maintain as near as possible an iodine number of 46.3.

The iodine numbers for the 24-hour period were as follows:

| Hours: | Iodine number |
|---|---|
| 0 | 46.2 |
| 6 | 46.3 |
| 12 | 46.3 |
| 18 | 46.4 |
| 24 | 46.3 |

In FIGURE 2 a modified form of the invention is disclosed. The form of the invention illustrated in FIGURE 2 is a carbon black furnace control system 10a which includes a carbon black furnace 11a identical to the furnace 11 described in the preferred form of the invention. The furnace 11a is fed by an air conduit 25a, an oil feeder pipe 21a and has a plurality of gas burners 20a connected to a gas manifold 24a. A gas pipe 23a supplies gas to the manifold 24a and extends to a source of gas (not shown). A gas bypass conduit 73 connects at opposite ends to the gas pipe 23a bypassing a manually controlled valve 74 in the gas pipe 23a. A pneumatically operated valve 31a is mounted in the bypass conduit 73 and is controlled by a signal line 71a extending from a control system (not shown) exactly like the control system described for the preferred form of the invention.

While the control valve 31a is illustrated as controlling bypass gas it should be understood that the valve 31a may control the complete gas supply should this be desired.

The following are by way of example and are not to be considered as limiting the invention.

EXAMPLE VII

A carbon black furnace 11a was operated for a 24 hour period under the bypass gas control of the first modified form of the invention. The initial settings were as follows:

Air—685 standard cubic feet per minute.
Gas—58 standard cubic feet per minute.
Oil—1.10 gallons per minute.

Iodine tests (ASTM Test D1510–60) were conducted each 6 hours and the furnace bypass gas was varied slightly by valve 31a in order to maintain as near as possible an iodine number of 45.

The iodine numbers for the 24-hour period were as follows:

| Hours: | Iodine number |
|---|---|
| 0 | 44.9 |
| 6 | 45.0 |
| 12 | 45.4 |
| 18 | 45.5 |
| 24 | 45.0 |

EXAMPLE VIII

Example VII was repeated with the control valve 31a applied to the total gas rather than the bypass gas.
The desired iodine number was 45.
The iodine numbers for the 24-hour period were as follows:

| Hours: | Iodine number |
|---|---|
| 0 | 45.3 |
| 6 | 45.3 |
| 12 | 45.2 |
| 18 | 45.2 |
| 24 | 45.5 |

A further modified form of the invention is illustrated in FIGURE 3, wherein, a carbon black furnace control system 10b includes a carbon black furnace 11b identical in every respect to the furnace 11 described in the preferred form of the invention. The furnace 11b is fed by an air conduit 25b and an oil feeder pipe 21b and has a plurality of gas burners 20b connected to a gas manifold 24b. A gas pipe 23b supplies gas to the manifold 24b and extends to a source of gas (not shown). An oil bypass conduit 75 connects at opposite ends to the oil pipe 21b bypassing a manually controlled valve 76 in the oil pipe 21b. A pneumatically operated valve 31b is mounted in the oil bypass line 75 and is controlled by a signal line 71b extending from a control system (not shown) exactly like the control system described for the preferred form of the invention.

While the control valve 31b is illustrated as controlling the bypass oil it should be understood that the valve 31b may control the complete oil supply should this be desired.

The following examples are illustrative of the invention but are not to be considered as limiting thereto.

EXAMPLE IX

A carbon black furnace 11b was operated for a 24-hour period under the bypass oil control of the second modified form of the invention. The initial settings were the same as Example I.

Air—696 standard cubic feet per minute.
Gas—58 standard cubic feet per minute.
Oil—1.10 gallons per minute.

Iodine tests (ASTM Test D1510–60) were conducted each 6 hours and the furnace bypass oil was varied slightly by valve 31b in order to maintain as near as possible an iodine number of 47.

The iodine numbers for the 24-hour period were as follows:

| Hours: | Iodine number |
|---|---|
| 0 | 46.7 |
| 6 | 47.8 |
| 12 | 47.5 |
| 18 | 47.2 |
| 24 | 46.9 |

EXAMPLE X

Example IX was repeated with the control valve 31b applied to the total oil rather than the bypass oil.
The desired iodine number was 47.

The iodine numbers for the 24-hour period were as follows:

| Hours: | Iodine number |
|---|---|
| 0 | 46.8 |
| 6 | 46.5 |
| 12 | 46.5 |
| 18 | 46.5 |
| 24 | 46.5 |

While Examples I through X were conducted with furnace settings to produce FEF carbon black, additional examples were conducted to produce ISAF, SAF, HAF and other furnace blacks with comparable results.

The control of carbon black furnaces by manual methods and periodic testing has produced carbon black products which vary widely in properties for different portions of the same runs. Under almost ideal conditions with the most highly skilled operators a range of 2.5 iodine numbers minimum variance results during a 24-hour period and with shift changes and less skilled operators the range often spreads to 6 iodine numbers and higher. Obviously when the iodine number range can be held to a minimum the carbon black product will be more uniform and the quality will be better maintained. With the invention in control of the carbon black furnace the iodine number spread can be maintained at less than 1.5 iodine numbers and even as low as 0.1 iodine numbers, as can be seen from the examples.

Oil adsorption, another measure of qualities of a carbon black is not materially affected by control of air, gas or oil separately by following the teachings of the invention. However, we have discovered that oil adsorption can be effectively controlled by regulating any two of the three components fed to the carbon black furnace.

The graph of FIGURE 5 illustrated the iodine numbers for each of the examples except Example III. In Example III the iodine numbers were much lower due to substantial decreases in the air volume and were too low for inclusion on this graph. However, it should be noted that the iodine number spread of Example III was 3.6 iodine numbers.

From FIGURE 5 it can be clearly seen that when the furnace is operating with the invention in control of the combustion ratio that the iodine number spread is reduced drastically.

Having thus described the preferred forms of the invention it should be understood that the invention is not limited thereto.

We claim:

1. A method of producing carbon black by the incomplete combustion of hydrocarbon make stock in a combustion chamber of a carbon black furnace by producing hot combustion gases by the burning of a fuel, directing said hot combustion gases into said combustion chamber, adding a hydrocarbon make stock to said combustion chamber, supplying an amount of air to said combustion chamber insufficient to support complete combustion of said hydrocarbon make stock, quenching the carbon black produced and collecting said carbon black, wherein the improvement comprises:

(1) withdrawing a portion of the combined combustion gases produced in the carbon black furnace through a sampling probe, (2) separating any entrained water and solids from said combustion gases, (3) sensing the composite relative thermal conductivity of the portion of the combined combustion gases drawn from the carbon black furnace in a thermal conductivity cell, (4) producing an electrical signal representative of the composite relative thermal conductivity of said combustion gases, (5) applying said electrical signal to a transducer to alter the input of at least one of the reactants selected from the group consisting of the fuel, hydrocarbon make stock and air fed to the furnace to maintain a pre-determined ratio of fuel, air and hydrocarbon make stock in response to the changes in said composite relative thermal conductivity, whereby the total variation in iodine number of the carbon black produced at said pre-determined ratio of reactants in less than 1.5 iodine numbers.

2. The method of claim 1 wherein said electrical signal is applied to a pressure transducer producing a pneumatic signal representative of said electrical signal and wherein said pneumatic signal is applied to a pneumatic valve to alter the input of at least one of said reactants.

3. The method of claim 2 wherein said pneumatic signal is applied to a pneumatic valve controlling at least a portion of the input flow of the air to the furnace.

References Cited

UNITED STATES PATENTS

| | | |
|---|---|---|
| 2,639,978 | 5/1953 | Zaikowsky. |
| 2,921,841 | 1/1960 | Gerrish. |
| 2,953,436 | 9/1960 | Kron _____ 23—209.6 |
| 3,096,157 | 7/1963 | Brown et al. |
| 3,097,518 | 7/1963 | Taylor et al. |

MORRIS O. WOLK, Primary Examiner

R. E. SERWIN, Assistant Examiner

U.S. Cl. X.R.

23—209.6, 232, 254, 255, 259.5